United States Patent [19]

Goshima et al.

[11] 4,121,883

[45] Oct. 24, 1978

[54] SCANNING DEVICE FOR RADIATION BEAMS

[75] Inventors: Takeshi Goshima; Fujio Iwatate, both of Tokyo, Japan

[73] Assignee: Canon Kabushiki Kaisha, Tokyo, Japan

[21] Appl. No.: 757,286

[22] Filed: Jan. 6, 1977

Related U.S. Application Data

[63] Continuation of Ser. No. 569,608, Apr. 21, 1975, abandoned.

[30] Foreign Application Priority Data

Apr. 22, 1974 [JP] Japan ................. 49-45284

[51] Int. Cl.² ............................................. G02B 27/17
[52] U.S. Cl. ........................................ 350/6.8; 350/285
[58] Field of Search ................. 350/6, 74, 3.5, 7, 182, 350/285; 358/199

[56] References Cited

U.S. PATENT DOCUMENTS

| | | | |
|---|---|---|---|
| 2,810,323 | 10/1957 | Coleman | 350/182 |
| 2,821,111 | 1/1958 | Coleman | 350/182 |
| 3,750,189 | 7/1973 | Fleischer | 350/7 |
| 3,870,394 | 3/1975 | Ploeckl | 350/7 |
| 3,877,777 | 4/1975 | Glenn, Jr. | 350/7 |

*Primary Examiner*—John K. Corbin
*Assistant Examiner*—B. W. de los Reyes
*Attorney, Agent, or Firm*—Fitzpatrick, Cella, Harper & Scinto

[57] ABSTRACT

A scanning device for light beams, wherein, for the purpose of permitting positional displacement of a scanning light beam to a certain extent in the direction perpendicular to its scanning direction, which is possibly caused by tilting or inclination of the reflection surfaces of scanning means such as a polygonal mirror, there is disposed a tolerating optical system in the light path of the light beam from the above-mentioned reflection surfaces. The positioned displacement of this light beam caused by tilting of the reflection surfaces of the light beam scanning means can be tolerated by a positional displacement tolerating optical system, wherein the focal length in the direction perpendicular to the scanning direction of the light beam is shortened in comparison with the focal length in the scanning direction of this tolerating optical system.

10 Claims, 14 Drawing Figures

SCANNING DEVICE FOR RADIATION BEAMS

This is a continuation, of application Ser. No. 569,608, filed Apr. 21, 1975, now abandoned.

BACKGROUND OF THE INVENTION

1. Field of the Invention

This invention relates to a light beam scanning device which tolerates the influence of an error in inclination of the radiation surface of a rotary mirror or vibrating mirror, and so on, e.g., the inclination assumed by reflection surface of a light beam scanning means with respect to its rotational axis or vibrating axis which causes a positional error in the direction vertical to the scanning direction of the scanning light.

2. Description of the Prior Art

In reading-out and recording operations of image informations, there has been known a method of scanning a read-out surface of an information or a recording surface with a radiation beam. According to this conventional method, there have been used a polygonal mirror or vibrating mirror, etc., as a scanning means to deflect the radiation beam along its scanning direction. However, it is difficult to manufacture the reflection surface of the scanning means in a predetermined, perfect relationship with the rotational axis or the vibrating axis. Even when the above-mentioned reflection surface is maintained at such predetermined, perfect relationship with the above-mentioned rotational axis or vibrating axis, such relationship undergoes variations with lapse of time without the rotational axis of the rotary mirror, or the vibrating axis of the vibrating mirror being able to maintain the definite direction. For instance, in the rotary mirror, there sometimes takes place that the actual rotational axis of the rotary mirror displaces from the regular position of the rotational axis owing to defective dynamic balance of the rotor of a motor which drives the rotational axis. In the above-mentioned case, the scanning light reflected at the reflection surface of the above-mentioned light beam scanning means causes positional displacement on the scanning surface where the writing-in or reading-out operation is to be performed in the direction orthogonal to the scanning direction thereof. For example, in a rotary polygonal mirror, every reflection surface is made in a perfectly parallel relationship with the rotational axis, and in the case of the rotating means being manufactured in high precision, the locus of the beam to be scanned on each of the above-mentioned reflection surfaces is perfectly coincident on the scanning surface. Where each of these reflection surfaces is not in such perfectly parallel relationship with the rotational axis, or the precision in the rotating means is not sufficiently high, the locus of the scanning line on the scanning surface at every reflection surface causes positional discrepancy in the direction orthogonal to the scanning direction of the light beam. Such error of the scanning beam on the scanning surface in the direction orthogonal to the scanning direction thereof has been a great barrier or obstacle in reading-out or recording of high density informations.

Due to such defects in the above-described scanning means, there have been adopted various ways of improving the positional error of the scanning beam on the scanning surface in the direction orthogonal to the scanning direction thereof. Of these various improvements, there are two representative methods, about which explanations will be made in the following.

The first method is to improve the precision in the scanning means per se. For example, every reflection surface in the rotary mirror is brought to a strictly parallel relationship with the rotational axis with high precision, or the precision in the rotary mirror of the rotating means is increased. This method, however, requires extremely precise working to obtain such high precision as required for the reading-out and recording operations of high density information, and to maintain over a long period of time such high precision, hence prohibitive manufacturing cost would incur.

The second method is to use an optical corrective means. For such optical corrective means, there has been a U.S. Pat. No. 3,750,189. According to this method, an incident light beam on the reflection surface of the rotary mirror is focussed on the reflection surface of the above-mentioned rotary mirror by means of a cylindrical lens in the direction where the tilting of the rotary mirror is corrected, in other words, only in the direction orthogonal to the scanning direction of the scanning beam. Accordingly, in an ideal image-forming or focussing state of the incident light beams, a straight line image is formed on the reflection surface of the above-mentioned rotary mirror. Since the optical image which forms an image on the scanning surface from the light beam scanned by the above-mentioned rotary mirror possesses one of the focal plane thereof on the reflection surface of the above-mentioned rotary mirror, and the other focal plane on the above-mentioned scanning surface, the reflection surface of the above-mentioned rotary mirror and the above-mentioned scanning plane is in a co-acting relationship with respect to the above-mentioned image forming optical system. Accordingly, on the reflection surface of the above-mentioned rotary mirror, a component of the scanning light is image-formed with respect to the direction where the inclination of the reflection surface of the rotary mirror is corrected, so that even if there occurs inclination of the reflection surface of the rotary mirror, no influence whatsoever is brought about on the scanning surface in the direction orthogonal to the scanning direction of the scanning beam due to tilting of the reflection surface.

However, even such corrective optical means is not free from various defects. In the first place, since the optical means is so designed that an image may be formed linearly on the reflection surface of the rotary mirror from the scanning light beam, the total light beams are reflected at a very tiny area on a reflection surface. As the result, any surface defect existing on the reflection surface such as very fine dust particles, or scratches, etc., greatly affect the amount of reflective light. In this case, there takes place amplitude modulation in the scanning beam, as a result of which the amount of scanning light becomes irregular on the scanning surface, which is not suitable for practical purposes.

In the second place, since the scanning light is collected at a very tiny area on the reflection surface, the energy density of the beam at this tiny area becomes increased to invite deterioration of the reflection surface due to heat. The resulting reduction in the reflective index on the reflection surface accelerates generation of heat on the reflection surface with the consequent deterioration of the reflection surface.

In the third place, even when the formation of the linear image is intended on the reflection surface as described above, it is practically impossible to constantly obtain such image on the reflection surface, because the reflection surface rotates in its operations. Therefore, the converging state of the light beam on the scanning surface worsens, which is an impermissible defect in the case where the scanning optical system of high resolution is demanded.

SUMMARY OF THE INVENTION

With the foregoing inherent defects of the conventional system in mind, the present invention proposes an improved light beam scanning device, wherein all the defects existing in the known device have been removed and the reading-out and recording operations of high density informations has been made possible with high resolution.

It is therefore a primary object of the present invention to provide a light beam scanning device, wherein an amount of positional displacement of the scanning spot on the scanning surface in the direction vertical to the scanning direction thereof due to tilting of the reflection surface can be tolerated.

It is a secondary object of the present invention to provide a light beam scanning device with minimal reduction in the amount of scanning light beam on the reflection surface due to the surface defects thereof, and minimal deterioration in the reflection surface due to heat generated by the scanning beam.

It is a tertiary object of the present invention to provide a light beam scanning device, wherein the state of light collection of the scanning spot on the scanning surface is not affected at all by the rotation of the rotary reflection mirror.

The foregoing objects and other objects as well as the construction and functions of the light beam scanning device according to the present invention will become more apparent and fully understood from the following detailed description thereof, when read in conjunction with the accompanying drawing.

DETAILED DESCRIPTION OF PREFERRED EMBODIMENTS

It is to be noted that, in the following explanation, the rotary mirror is particularly referred to as the scanning means.

The light beam scanning device according to the present invention utilizes an optical system which possesses a light collecting function and tolerates the positional displacement on the scanning surface of the scanning light beam caused by tilting or inclination of the reflection mirror of the light beam scanning means. This positional displacement tolerating optical system has a shorter focal length in the direction perpendicular to the scanning direction of the scanning light beam than the focal length in the scanning direction of this positional displacement tolerating optical system.

For such positional displacement tolerating optical system, there is preferably used a light collecting optical system consisting of an afocal converter and a light collecting lens. For the afocal converter, there is a cylindrical afocal converter, wherein a cylindrical concave lens and a cylindrical convex lens are combined, or a prismatic afocal converter utilizing a prism or prisms. (vide: "Modern Optical Engineering" by Warren J. Smith, pp 239–241, 1966, McGraw Hill).

When the positional displacement tolerating optical system consisting of this afocal converter and a converging optical system is used, a composite focal length of this displacement tolerating optical system becomes different between the lengthwise direction of the afocal converter and a direction perpendicular to this lengthwise direction. Therefore, by shortening the composite focal length of the optical system in the direction perpendicular to the scanning direction of the light beam, it becomes possible to tolerate any variation in the vertical direction of the scanning light beam. It should be noted that, although the above-mentioned converter is designed to be afocal, the correction of the positional displacement due to tilting of the reflection surface is possibly done by this converter, even when the afocal state is in a slight discrepancy.

More detailed explanations for the foregoing principle will follow hereinbelow with reference to preferred embodiments of the present invention.

Figure 1:
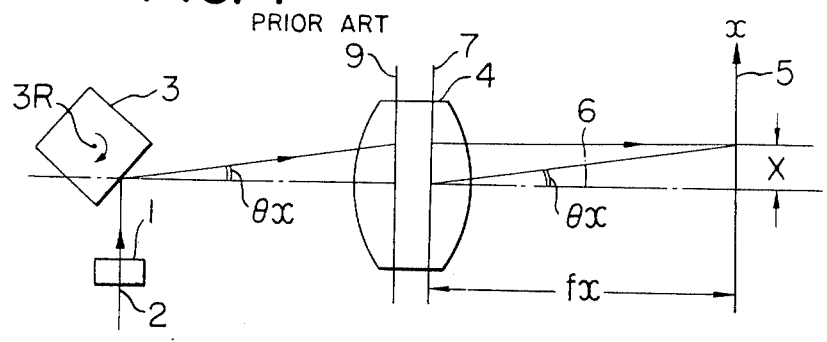
FIGS. 1 and 2 indicate beam scanning in a conventional light beam scanning optical system.
Figure 2:
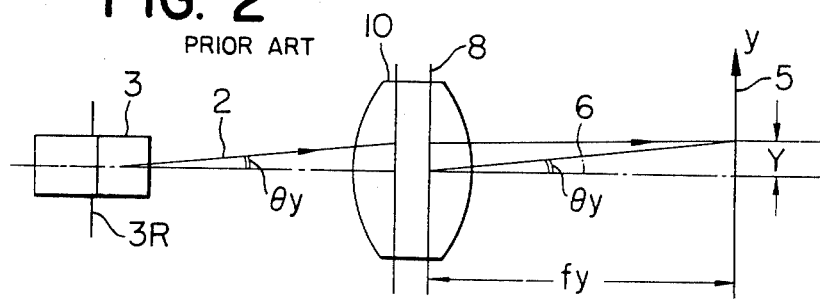

Referring to FIGS. 1 and 2 which show, respectively, a schematic plan view and a side elevational view of a conventional scanning optical system for the purpose of explaining the principle of the present invention, the optical system basically consists of a beam expander 1 which expands parallel light beam from a light source (not shown) such as laser, etc., scanning beam 2, a rotary polygonal mirror 3, light collecting lenses 4 symmetrical with respect to their spherical surfaces, and a scanning surface 5. Incidentally, a reference letter $x$ designates the abscissa on the scanning surface, and a reference letter $y$ the ordinate thereof. In the drawing figure, the reference numeral 6 designates the optical axis of a light collecting lens system, 7 denotes the rear side principal plane of the light collecting optical system 4 having the same directional component as the axis $x$ of the scanning surface, 8 refers to the rear side principal plane of the light collecting optical system 4 having the same directional component as the axis $y$ of the scanning surface, and 9 and 10 represent the front side principal plane thereof. Further, reference letters $f_x$ designates a focal length having the component in the direction of the axis $x$ in the light collecting lens system 4, $fy$ denote a focal length having the component in the direction of the axis $y$ in the light collecting lens system 4, $\theta x$ refers to an angle which the light beam 2 defines immediately after its reflection by the rotary reflection mirror 3 and the above-mentioned optical axis 6 assumes the directional component of the axis $x$, which corresponds to the angle of the scanning direction, and $\theta y$ represents an angle which the light beam 2 defines and the optical axis 6 assumes the directional component of the axis $y$, which is representative of the angular error caused by the inclination of the reflection surface of the rotary reflection mirror 3 at its rotation, or caused by inclination which the above-mentioned reflection surface assumes with respect to the rotational axis at the time of manufacturing.

When the light beam 2 is projected into the light collecting lens system at its incident angles of $\theta x$ and $\theta y$, respectively, with respect to the directions of the axes $x$ and $y$, the positions of the scanning light spots ($X_1$, $Y_1$) on the scanning surface 5 will be represented by the following equations, when the point at which the optical axis 6 and the scanning surface 5 intersects is taken as the original point:

$$X_1 = fx \tan \theta x . \tag{1}$$

$$Y_1 = fy \tan \theta y . \tag{2}$$

From the above equation (2), for the scanning spot on the scanning surface to be tolerated from influence due to tilting of the rotary mirrors, it is sufficient that the rear side focal length $fy$ in the direction of the axis $Y$ of the above-mentioned light collecting lens system 4 be shortened.

Figure 3:
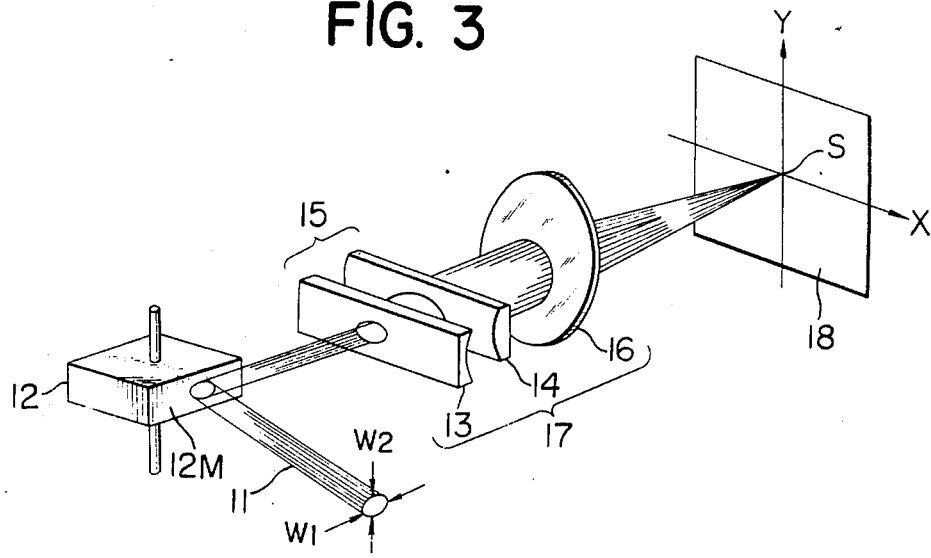
FIG. 3 is a perspective view showing one embodiment of the light beam scanning device according to the present invention.

The above-mentioned method will be explained in greater detail hereinbelow. There has heretofore been known an optical system using a cylindrical lens having a different focal length in the mutually orthogonal directions. By combining this cylindrical optical system with the above-mentioned light collecting lens, there can be obtained a light collecting optical system 17 (a tolerating optical system) as shown in FIG. 3, in which the focal length is different in the mutually orthogonal directions. This light collecting optical system serves to correct the inclination of the rotary reflecting mirror.

Figure 4:
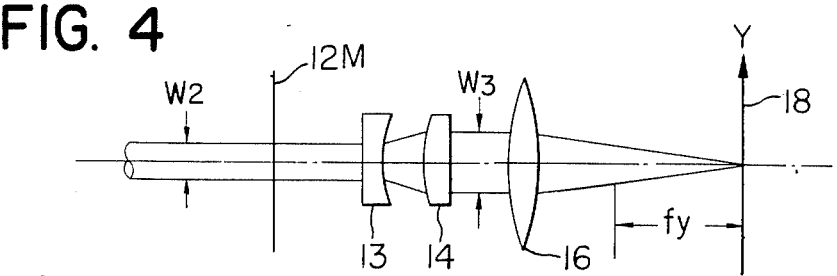
FIG. 4 is a side elevational view of the scanning optical system shown in FIG. 3.
Figure 5:
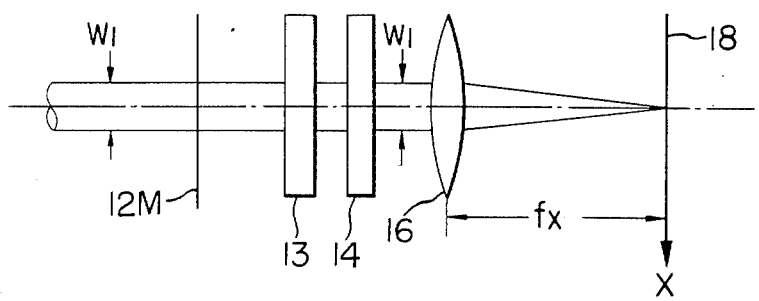
FIG. 5 is a plan view of the scanning optical system shown in FIG. 3.
Figure 6:
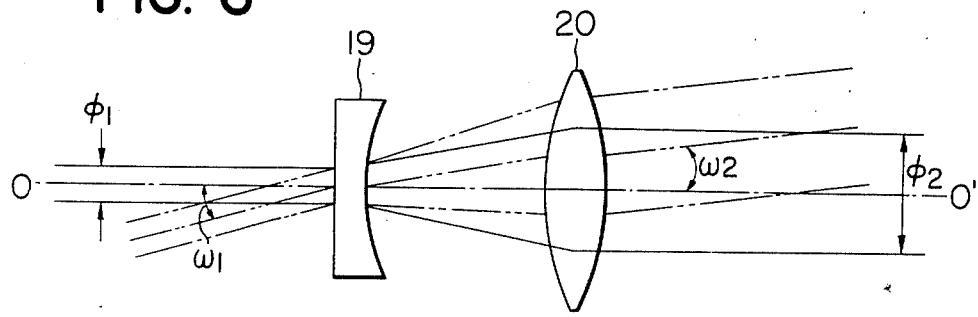
FIG. 6 is a side elevational view showing an afocal light beam expanding system using lenses which constitute a part of the principle of the present invention.

FIG. 3 is a perspective view showing one embodiment of the present invention for use in the above-mentioned method. FIG. 4 is a side elevational view of the scanning optical system shown in FIG. 3, and FIG. 5 is a plan view of the same system. In FIGS. 3, 4 and 5, the scanning light beam 11 from a laser beam source of (not shown) is projected onto one of the reflection surfaces 12M of the rotary polygonal mirror 12 in the form of a parallel light beam having a width $W_1$ in the scanning direction, and a width $W_2$ in the direction orthogonal to the scanning direction. In the case of the writing-in operation, this light beam is pulse-modulated by a modulating means (not shown). The parallel light beam reflected at the above-mentioned reflection surface 12M is of the same beam diameter as that of the incident light beam from the source. Subsequently, this light beam is projected into the light collecting optical system 17 consisting of a cylindrical afocal light beam expanding system 15 and a light collecting lens 16 so as to collect the light beam on the scanning surface 18 with its diameter being expanded in the direction of the axis Y in the scanning surface 18. Incidentally, the above-mentioned cylindrical afocal light beam expanding system 15 is composed of a cylindrical concave lens 13 and a cylindrical convex lens 14, both being disposed in such a manner that the generatrices thereof may be parallel with the scanning direction of the scanning light beam. This scanning surface should desirably be a focussing plane of the light collecting optical system (tolerating optical system). In the case of the writing-in operation, the above-mentioned scanning surface 18 may be any appropriate member such as, for example, photosensitive paper, heat-mode laser beam recording member, or a drum surface of a reproduction machine, etc. In the case of the reading-out operation, the light beam reflected at the scanning surface is received by a half-mirror which is interposed in a slanted direction between the scanning surface 18 and the light collecting optical system 17.

When the diameter of the scanning light beam in the direction of the above-mentioned axis $Y$ has been expanded from $W_2$ to $W_3$, the composite focal length of the light collecting optical system 17 in relation to the direction of the axis $Y$ can be expressed by the following equation:

$$fy = f \times W_2/W_3 \tag{3}$$

where $f$ is the focal length of the light collecting lens 16. In other words, by insertion of the light beam expanding system 15 consisting of the concave and convex cylindrical lenses into the light collecting optical system 17, the focal length in the direction of the axis Y, where the positional error in the scanning light beam caused by tilting of the rotary reflection mirror is to be corrected, can be made $W_2/W_3$ times shorter than in the case where the light collecting lens 16 alone is used. The scanning direction of the light beam, i.e., the direction of the axis X, corresponds to the generatrix direction of the above-mentioned cylindrical lenses 13, 14, hence the lens system is anamorphic since the diameter of the scanning light beam is changed in the Y direction but does not change its diameter in the X direction. Accordingly, irrespective of whether the above-mentioned afocal light beam expanding system 13, 14 is inserted or not, the focal length $fx$ in the directional component of the axis $Y$ of the light collecting optical system does not change at all.

The foregoing explanations with respect to the embodiment shown in FIG. 3 have been made using the afocal light beam expanding optical system composed of the set of cylindrical concave and convex lenses. It is also feasible that use of an optical system composed of the cylindrical convex lens and the light collecting lens without the cylindrical concave lens being removed from the light collecting optical system in FIG. 3 also contributes to shortening the focal distance in the direction of the axis $Y$ of the light collecting optical system in comparison with the case where the light collecting lens alone is used, whereby the system can be utilized for correcting the positional error of the scanning light beam due to inclination of the rotary reflection mirror in the direction of the axis Y. It is also possible that the correction of this positional error can be accomplished by even deviating from the afocal condition in this afocal optical system 15, i.e., by slightly changing the interval between the lenses 13 and 14. Furthermore, in this embodiment, the light collecting lens 16 is used for focussing the laser light beam on the writing-in surface, although the positional error in the scanning light beam due to tilting of the rotary reflection mirror can be corrected in the absence of this lens 16. In this case, however, a parallel light beam is directed to the writing-in surface.

Figure 7:
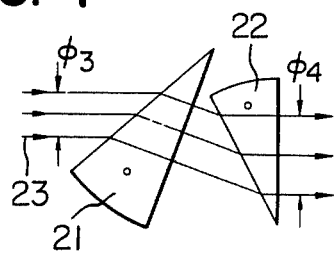
FIG. 7 is a side elevational view showing an afocal light beam expanding system using prisms, which constitutes the other part of the principle of the present invention.

The embodiment shown in FIG. 7 is an afocal converter using two pieces of wedge-shaped prisms 21, 22. The incident parallel light beam 23 on this converter is expanded its beam diameter from $\phi_3$ to $\phi_4$ by these wedge-shaped prisms in a state of the incident light and the projecting light mutually maintaining their parallel relationship. Therefore, in this afocal converter, too, the same relationship as the above-mentioned equation (3) holds good, so that any positional error due to inclination of the scanning reflection mirror can be corrected.

Figure 8A:
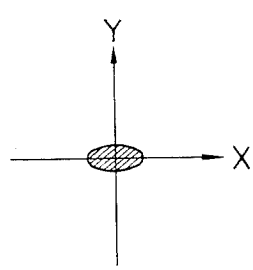
FIGS. 8A, 8B and 8C, respectively, indicate the shapes of the scanning light spot.
Figure 8B:
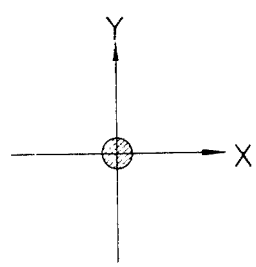
Figure 8C:
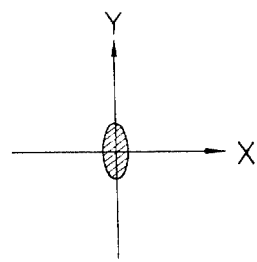

In the following, explanations will be made about the shape of the spot of the scanning light beam on the scanning surface in reference to FIGS. 3, 4 and 5. Ordinarily, the shape of the scanning spot may be either circular or elliptical depending on the purpose of the scanning. The factor to determine the shape of the scanning spot on the scanning surface is the value of F-number of this light collecting optical system in both directions of the axes X and Y. Now assume that the foci of the light collecting optical system 17 in both directions of the axes X and Y are exactly on the scanning surface 18. If the F-number in the direction of the axis X thereof is $Fx$, and the F-number in the direction of the axis Y thereof is $Fy$, the scanning spot on the scanning surface assumes an ellipse having long or major axis in the direction of the axis X as shown in FIG. 8A in case of $Fx < Fy$, a true circle as shown in FIG. 8B in case of $Fx = Fy$, and an ellipse having the long or major axis in the direction of the axis Y as shown in FIG. 8C in the case of $Fx > Fy$.

It often takes place that, in order to fill the gap between adjacent scanning lines, width of the scanning line needs be broadened to the scanning pitch or to a width wider than the scanning pitch. In such a case, arrangement is made in such a way that the scanning spot is shaped as shown in FIG. 8C where the short or minor axis is in parallel with the scanning direction, and the long or major axis is in parallel with the axis Y perpendicular to the axis X, so that the F-number values in both directions of the axes X and Y are intentionally varied.

Figure 9A:
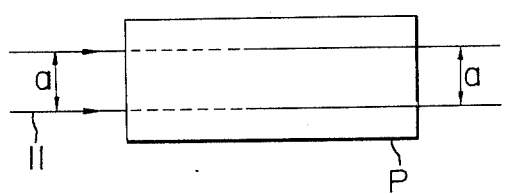
FIGS. 9A and 9B, respectively, indicate light beam expansion in a single direction using a prism.
Figure 9B:
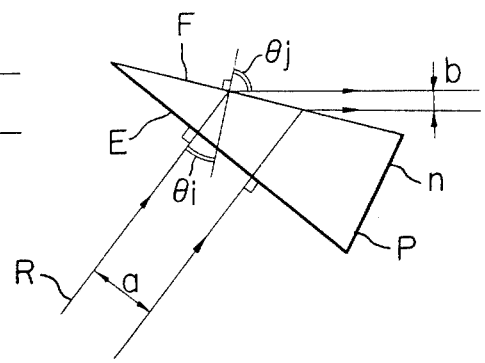

FIGS. 9A, 9B and FIGS. 10A, 10B respectively show the optical means to preliminarily vary the ratio of the beam diameter of the incident light beam on the above-mentioned light collecting optical system in the direction of the axis X to the beam diameter in the axis Y so as to cause the F-numbers of the scanning spot to agree. FIGS. 9A and 9B indicate a case of using a prism P, wherein FIG. 9A is a plan view thereof and FIG. 9B is a side view thereof. In the embodiment shown, the light beam R having a width or diameter $a$ is vertically projected onto the surface E of the prism P having a refractive index $n$, and subsequently it is projected onto the surface F at an incident angle $\theta_i$. Thereafter, the light beam R is projected from the prism P through its surface F at a projecting angle $\theta_j$. In this case, the projecting light beam of a direction as viewed from the plane is not affected by the beam width thereof, but only the projecting light beam in the direction as viewed from the front direction is affected to have the beam width $b$, whereby the following relationship is established between the beam widths $a$ and $b$.

$$a/b = \cos \theta_i / \cos \theta_j$$

$$n \sin \theta_i = \theta_j$$

It is also possible to vary the ratio $a/b$ of the beam width by use of a plurality of prisms.

Figure 10A:
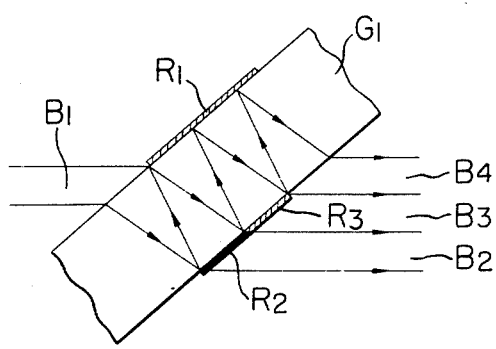
FIGS. 10A and 10B, respectively, indicate light beam expansion in a single direction using a glass block.

The structure shown in FIG. 10A is such that a total reflection mirror surface $R_1$, and semi-transparent mirrors $R_2$ and $R_3$ having their reflective indexes of ⅔ and ½ and above, respectively, are fixedly provided on a glass block $G_1$ with their reflection surfaces being faced thereto. As shown, the semi-transparent mirrors $R_2$ and $R_3$ are disposed in parallel with the total reflection mirror $R_1$. In consideration of the values of the reflective indexes of the above-mentioned mirrors $R_2$ and $R_3$, thickness of the glass block $G_1$, and inclination of the light beam incident on the glass block $G_1$, and so on, the parallel beam $B_1$ introduced into the glass block $G_1$ can be corrected into mutually adjacent light beams $B_2$, $B_3$ and $B_4$ having a vertical/horizontal ratio of about 3:1.

Figure 10B:
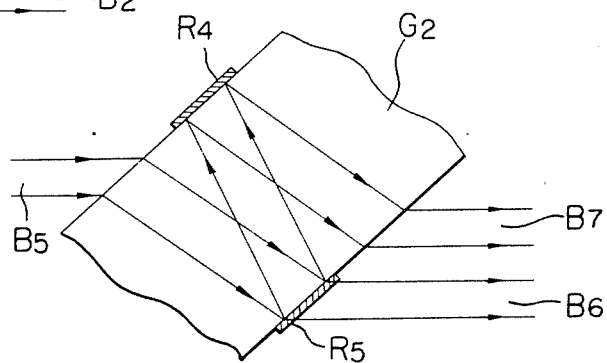

FIG. 10B shows a structure corresponding to that shown in FIG. 10A, except for removal of the semi-transparent mirror $R_3$ therefrom. In this structure, the reference symbol $R_4$ designates a total reflection mirror, and $R_5$ denotes a semi-transparent mirror having its reflective index of ½ and above. Although the beams $B_6$ and $B_7$ projecting out of the glass block $G_2$ are mutually parallel, discrete light beams, the ratio between the long and short axes is approximately 3:1. When the thus separated two discrete light beams $B_6$ and $B_7$ are used, the degree of concentration of energy at the image forming point is far superior to the case where a single beam $B_5$ is used.

Here, explanations will be made in reference to FIGS. 3 and 4 as to what significance the present technique would have with respect to the corrective action of the positional error in the scanning light beam due to tilting of the reflection surface or rotational axis of the rotary reflection mirror in the present invention. Take a scanning system utilizing a light collecting lens 16 having a focal length of 300 mm and F-number 30, and laser beam of 0.63 microns in wavelength, as an example. The diameter of the scanning spot to be obtained at this time is approximately 50 microns. Now assume that, with this scanning spot, a roster scanning of 50 microns pitch is to be performed. The permissible error in the pitch for the roster scanning is +2.5 microns when this roster is observed with naked eyes. On the other hand, the error of inclination which the reflection surface of the rotary polygonal mirror assumes with respect to the rotational axis thereof to be obtained from the present level of the manufacturing technique is ±3 inches or so. In this case, if the light collecting lens 16 having a focal length of 300 mm alone is used, and no optical corrective means against the inclination is used, the error amounts to approximately 4 times as large as the permissible error. In this case, if the optical system 15 for correcting the positional error due to the inclination is inserted to have the beam diameter $W_2$ of 1 mm and $W_3$ of 10 mm in FIG. 4 so as to tolerate the positional error due to inclination in the direction of the axis Y by one tenth of the permissible error, the above-mentioned error in the pitch becomes ±0.9 micron, which corresponds to 1/2.5 or below of the permissible error value.

In this connection, for the light collecting lens 16, a conventional f-θ lens is used with a view to scanning the surface to be scanned with the scanning spot at a constant speed in proportion to the rotation of the rotary mirror. Securing of this constant speed of the scanning spot is extremely important in the case where electrical signal sent as an equal time interval is to be recorded on a recording medium at an equal time interval, and so on.

As stated in the foregoing, in the optical scanning system according to the present invention, the light beam is projected onto the rotary scanning mirror in parallel, or in a substantially parallel state, after which the above-mentioned scanning light beam is projected into the light collecting optical system to focus light on the scanning surface. In this light collecting optical system, the corrective action of the positional error due to inclination of the rotary mirror is carried out by either shortening the focal length in the direction where the deviation of the scanning light beam due to tilting of the rotational axis or reflection surface of the rotary mirror is to be corrected, or by making the angular magnification of the light collecting optical system smaller than 1. In the present invention, since the diameter of the incident light beam of the above-mentioned rotary mirror is larger than that in the conventional inclination correction optical system, any undesirable phenomena such as scattering of light beam due to surface defects on the above-mentioned reflection surface and substances adhered on the reflection surface can be made minimal. Also, as the energy density of the beam on the reflection surface becomes lowered, the reflection surface is free from damage. Further, in the present invention, since the incident light beam on the reflection surface of the rotary mirror is parallel, the light beam reflected and projected therefrom is also parallel, in whatever way the reflection surfaces may rotate, so that there occurs no variation in the state of the light collecting of the scanning spot on the scanning surface accompanied by rotation of the rotary mirror, whereby a good spot image of satisfactory degree of light collecting can always be obtained. As such, the device of the present invention exhibits remarkable effect in realizing the light scanning device with high performance and is suitable for high speed and high density scanning.

Although the present invention has been described with particular reference to preferred embodiments thereof, it should be understood that these preferred embodiments are merely illustrative and not restrictive, and that any change and modification may be effected without departing from the spirit and scope of the present invention as recited in the appended claims.

We claim:

1. A scanning device for a radiation beam, comprising:

a radiation beam source;

scanning means for receiving the radiation beam from said source, and for deflecting the beam along a scanning surface in a predetermined scanning direction; and converging optical means interposed between said scanning means and the scanning surface to converge the scanning light beam from said scanning means onto said scanning surface, said converging optical means consisting of an afocal anamorphic optical system and a light beam converging optical device comprising an $f\text{-}\theta$ lens, wherein coincidence exists between a direction along which said afocal anamorphic optical system has no refractive power, and a scanning direction of the beam incident on said optical system, and wherein the radiant beam converged on the scanning surface scans said surface at a constant speed.

2. The device as defined in claim 1, wherein said afocal anamorphic optical system comprises a plurality of cylindrical lenses, and wherein the cylindrical axis of each lens coincides with said scanning direction of the beam.

3. The device as defined in claim 2, wherein said plurality of cylindrical lenses consists of a combination of a single concave cylindrical lens and a single convex cylindrical lens.

4. The device as defined in claim 3, wherein said radiation beam source is a laser tube.

5. The device as defined in claim 1, wherein said afocal anamorphic optical system comprises a plurality of prisms.

6. The device as defined in claim 5, wherein said plurality of prisms consists of a pair of wedge-shaped prisms.

7. The device as defined in claim 6, wherein said radiation beam source is a laser tube.

8. A scanning device for a radiation beam, comprising:

a radiation beam source;

scanning means for receiving the radiation beam from said source, and for deflecting the beam along a scanning surface in a predetermined scanning direction; and converging optical means interposed between said scanning means and the scanning surface to converge the scanning light beam from said scanning means onto said scanning surface, said converging optical means comprising an afocal anamorphic optical system comprising a plurality of prisms and a light beam converging optical device, wherein each prism has an edge line defined by planar surfaces thereof through which the radiation beam passes, and wherein said edge lines extend in the same direction as the scanning direction.

9. The device as defined in claim 8, wherein said plurality of prisms consists of a pair of wedge-shaped prisms.

10. The device as defined in claim 9, wherein said radiation beam source is a laser tube.

* * * * *

UNITED STATES PATENT OFFICE
CERTIFICATE OF CORRECTION

Patent No. 4,121,883  Dated  October 24, 1978

Inventor(s) TAKESHI GOSHIMA, ET AL

It is certified that error appears in the above-identified patent and that said Letters Patent are hereby corrected as shown below:

In the Abstract, line 9, "positioned" should read --positional--;

Column 8, line 44, change "roster" to --raster--;

Column 8, line 46, change "roster" to --raster-- (both occurrences).

Signed and Sealed this

Sixth Day of February 1979

[SEAL]

Attest:

RUTH C. MASON
Attesting Officer

DONALD W. BANNER
Commissioner of Patents and Trademarks